United States Patent [19]
Rom

[11] 3,908,631
[45] Sept. 30, 1975

[54] METHOD AND APPARATUS FOR CONVERTING SOLAR RADIATION TO HEAT ENERGY

[76] Inventor: Frank E. Rom, 171 Belmar Blvd., Avon Lake, Ohio 44012

[22] Filed: Mar. 12, 1974

[21] Appl. No.: 450,424

[52] U.S. Cl. .......................... 126/270; 34/93; 52/2
[51] Int. Cl.² ........................................... F24J 3/02
[58] Field of Search ........ 126/270, 271; 34/93; 52/2

[56] References Cited
UNITED STATES PATENTS

| | | | |
|---|---|---|---|
| 2,782,794 | 2/1957 | White | 52/2 |
| 3,022,781 | 2/1962 | Andrassy | 126/271 |
| 3,077,190 | 2/1963 | Allen | 126/271 |
| 3,125,091 | 3/1964 | Sleeper, Jr. | 126/271 |
| 3,436,908 | 4/1969 | Van Delic | 126/270 X |
| 3,513,828 | 5/1970 | Masters | 126/271 |

FOREIGN PATENTS OR APPLICATIONS

| | | | |
|---|---|---|---|
| 1,161,887 | 8/1969 | United Kingdom | 126/271 |
| 276,788 | 11/1965 | Australia | 126/270 |

*Primary Examiner*—William F. O'Dea
*Assistant Examiner*—Peter D. Ferguson
*Attorney, Agent, or Firm*—Bosworth, Sessions & McCoy

[57] ABSTRACT

Method and apparatus for converting solar radiation to thermal energy for heating a gaseous stream such as air to be used for heating or drying purposes. The air or other gaseous mixture is flowed through an elongated heating passage defined by plastic film formed of solar radiation absorbing or opaque (black) material and the film is inflated by the fluid pressure of the gaseous stream passing therethrough. The heating passage is surrounded on top by an insulating space defined by the outer surface of the top portion of the opaque film and by an outer sheet of clear (solar radiation transparent) plastic film that is inflated into an expanded position by the gaseous insulating medium therein. Air or another gaseous mixture is flowed through the heating passage wherein solar radiation absorbed by the film is converted to thermal energy that is transferred to the gaseous stream.

9 Claims, 4 Drawing Figures

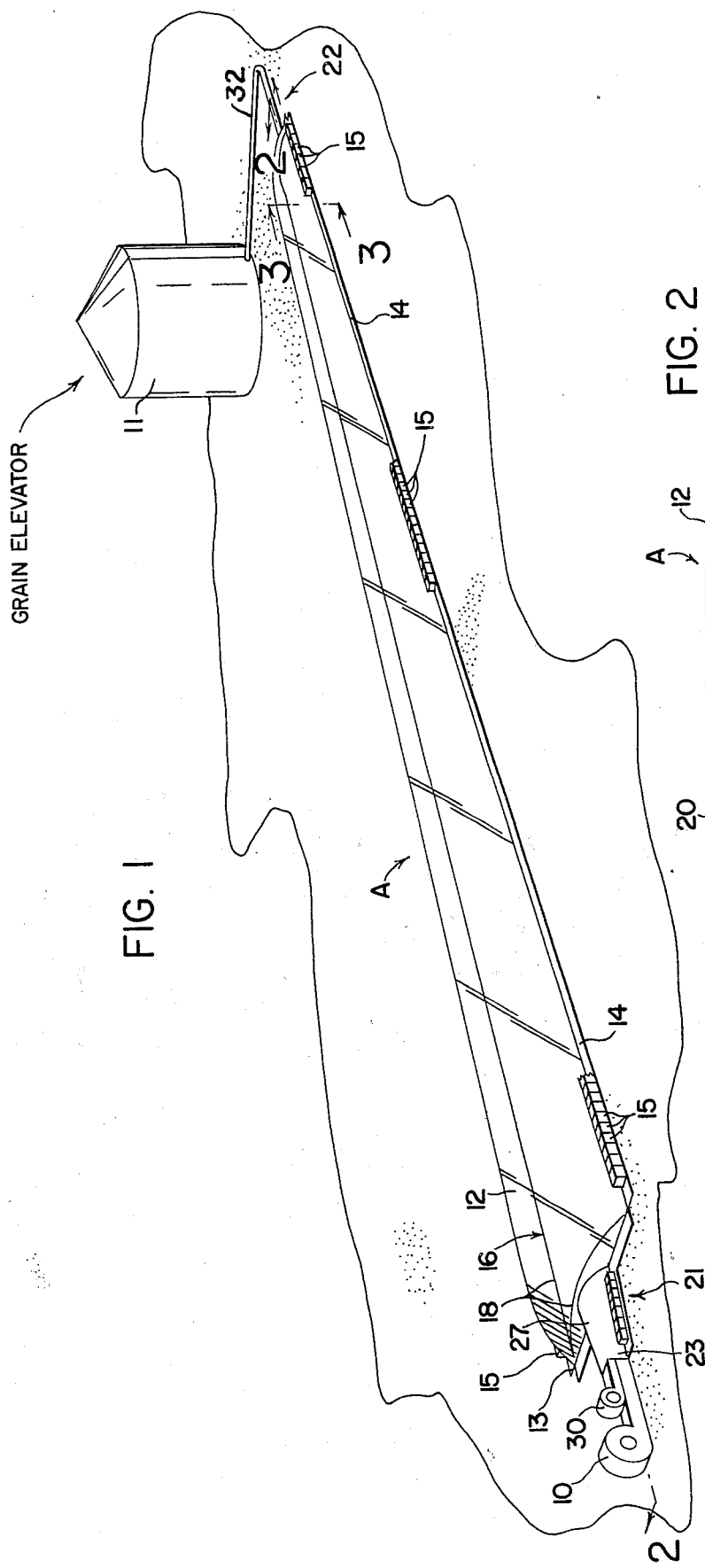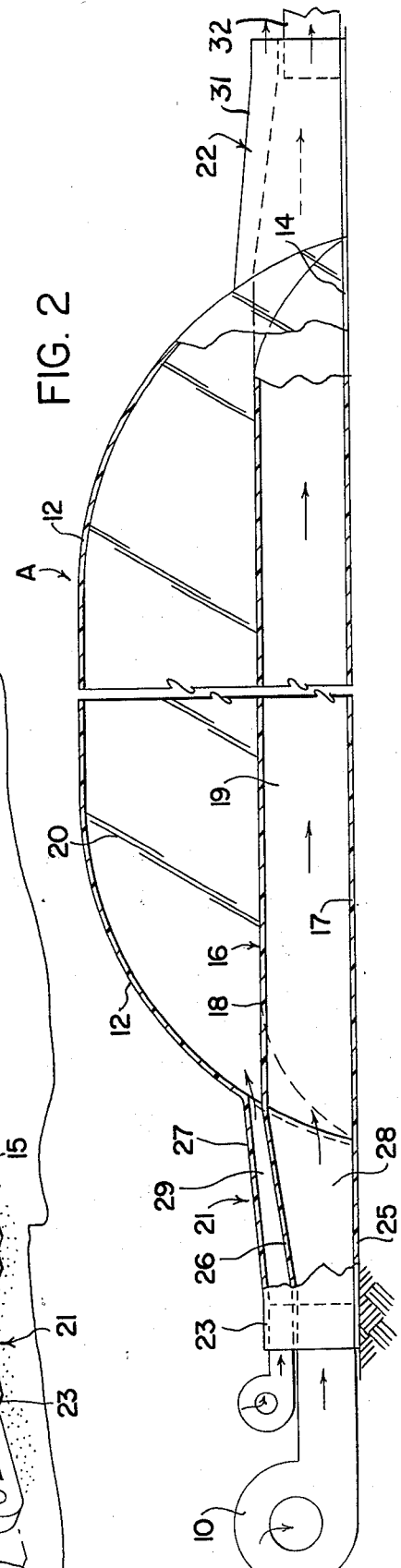

METHOD AND APPARATUS FOR CONVERTING SOLAR RADIATION TO HEAT ENERGY

BACKGROUND OF THE INVENTION

This invention relates to the utilization of solar radiation for heating purposes and especially to the heating of a gaseous mixture using solar radiation. More particularly, the invention relates to a solar radiation conversion system that is located on a suitable elongated land area and supported in operable condition by fluid pressure from the gaseous stream being heated as it is conveyed therethrough.

The use of solar radiation as a potential energy source has received considerable attention in recent years due to the developing shortage of more traditional energy sources such as fuel oil, natural gas, and coal. This attention is also due to the rapidly increasing cost of these energy sources. Solar radiation constitutes an almost unlimited source of energy on the earth but up to this time has not been capable of any significant practical utilization. This lack of capability is due, in part, to the scarcity of practical technology as to the conversion of solar radiation into useable energy forms and so as to the availability of the necessary space and equipment for collection and conversion of solar radiation.

Some of the difficulties in this respect include: (1) the irregular nature of the time intervals during which solar radiation is available, (2) the requirement for large land areas over which to collect the solar radiation and (3) the need for energy conversion equipment that can convert and store the collected energy at an acceptable efficiency level.

Where solar radiation is utilized only for heating purposes, particularly for heating air, and where the solar radiation is converted directly into thermal energy with no additional energy conversion to a storable form, its application is limited to those situations where continuous heating or even periodic heating at regular intervals is not required. Such applications include drying operations such as the warm air drying of stored grain, a specific application in which the present invention may be advantageously utilized. The drying may be accomplished at irregular intervals o long as a sufficient amount of drying is accomplished over an extended period of time.

The method and apparatus of the present invention accomplish the objectives described above and afford other features and advantages heretofore not obtainable.

SUMMARY OF THE INVENTION

It is among the objects of the invention to heat a gaseous stream using solar radiation.

Another object is to utilize solar radiation impinging on an elongated zone of an open land area to heat a gaseous stream utilizing a prefabricated readily assembled apparatus of collapsible construction.

Still another object is to convert solar radiation into thermal energy for heating a gaseous stream with equipment that can be quickly set up and removed and that is of low cost construction.

These and other objects are accomplished with the apparatus of the invention whereby solar radiation is converted into thermal energy for heating a gaseous stream that may be used for heating or drying purposes, such as, for drying stored grain. The apparatus includes an elongated inflatable tubular heating conduit formed of solar radiation absorbing film, such as, for example, a black or otherwise opaque plastic film adapted to be located on the ground and inflated by fluid pressure of the gaseous stream being conveyed therethrough. Surrounding the conduit is an elongated sheet of solar radiation transparent film such as, clear plastic film that is sealed along its longitudinal edges to the film of the tubular conduit and which is adapted to form therewith an inflatable insulating enclosure between the conduit and the surrounding atmosphere. The air or other gaseous medium in the conduit acts as an insulation between the heating conduit and the surrounding atmosphere to minimize the heat loss from the heated gaseous stream being conveyed.

The gaseous medium is introduced at one end of the conduit and pumped or conveyed therethrough, such as, by a blower or the like. During its passage through the conduit, the air or other gaseous medium is heated in the conduit as the black film absorbs solar radiation and converts it into thermal energy which is in turn transferred to the gaseous stream. The pressure of the gaseous medium being conveyed through the conduit is sufficient to maintain the conduit in a generally inflated condition. The enclosure surrounding the conduit is also inflated by using fluid pressure to maintain structural rigidity and to maintain the desired volume of insulating gas between the conduit and the surrounding atmosphere.

According to the preferred embodiment, the plastic film is prefabricated and sealed along longitudinal marginal edge portions so that it may be placed on the ground and simply unrolled into an operating condition. Also, a flap is preferably provided along the longitudinal edges on which weights and/or stakes may be placed to anchor the respective lengths of film in position. When the apparatus is being used, the conduit and surrounding enclosure are inflated. However, when the apparatus is not in use, the conduit and enclosure are preferably deflated to minimize potential wind damage etc.

BRIEF DESCRIPTION OF THE DRAWINGS

FIG. 1 is a perspective view of an apparatus embodying the invention as used in association with a grain bin;

FIG. 2 is a broken sectional view on an enlarged scale taken on the line 2—2 of FIG. 1;

DESCRIPTION OF THE PREFERRED EMBODIMENT

Figure 3:
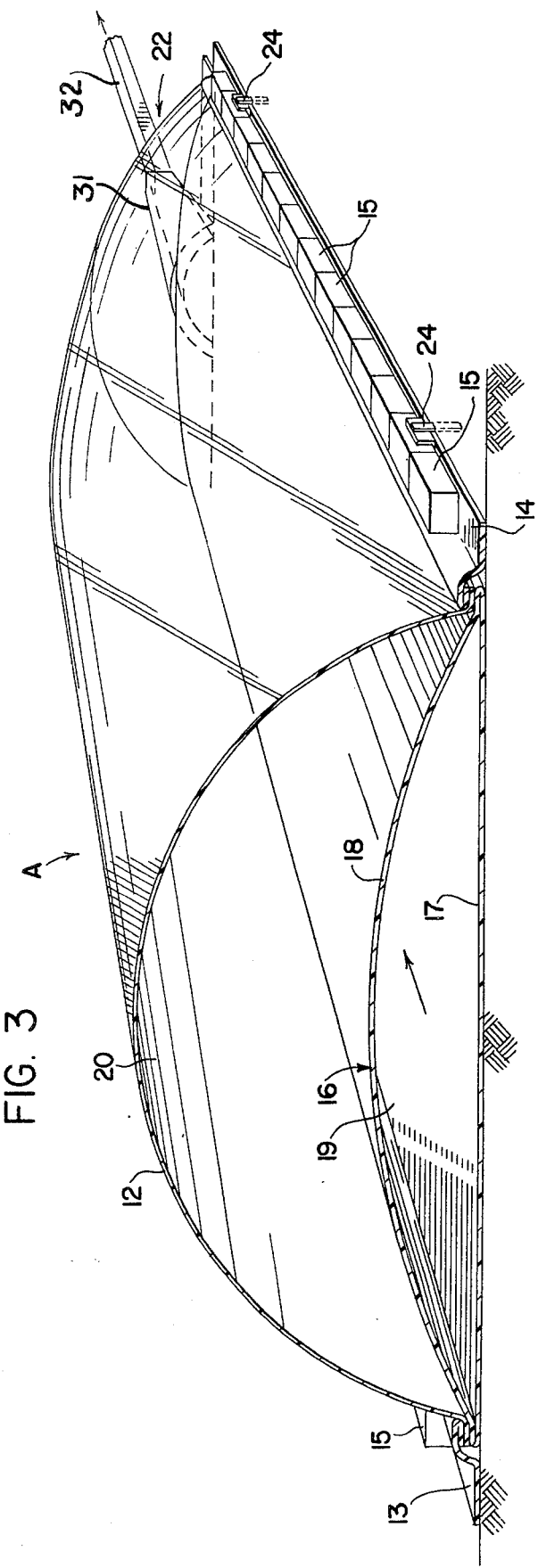
FIG. 3 is a cross section through a perspective view on an enlarged scale taken on the line 3—3 of FIG. 1.

Referring more particularly to the drawings and initially to FIGS. 1, 2 and 3, there is shown an elongated inflatable assembly A embodying the invention and adapted to be located in a position resting on the ground along a narrow, flat strip of land that is exposed to solar radiation, preferably during all daylight hours, and that is close to the facility in connection with which the invention is to be used. A blower 10 is located at one end of the assembly for supplying ambient air at the temperature of the surrounding atmosphere to the assembly A so that it may be heated for the intended purpose.

For the purpose of illustration, the heated air is used in connection with the warm air drying of stored grain in the grain bin 11. Accordingly, the assembly A will be positioned as close as possible to the grain bin 11 and the stream of air heated with solar radiation will be conveyed to the grain bin 11 and used with conventional equipment for drying grain.

The assembly A includes a sheet 12 of plastic film which, in its operating condition, is inflated to the outwardly expanded taut condition illustrated in FIGS. 1, 2 and 3. In this condition, the film 12 has a rounded exposed outer surface which presents minimum resistance to wind regardless of the direction from which it may impinge upon the structure 10. The sheet 12 is formed of clear plastic film that is transparent to solar radiation, such as, for example, polyethylene, vinyl, or a copolymer that is stablized against damage from ultraviolet radiation. The sheet 12 has flaps 13 and 14 adhered such as by heat sealing along its opposite longitudinal edges. The flaps 13,14 are preferably formed of a fiber reinforced plastic sheet material and serve as a means for securely anchoring the structure 10 to the ground. Anchor weights, such as, concrete blocks 15 are positioned along the flaps 13,14 to securely anchor the assembly A in position.

Located within the film 12 and sealingly attached thereto, as will be described below, is a length of black plastic film 16 of tubular form and arranged to provide a bottom layer 17 that rests against the ground and a top layer 18 which, when the tubular film is inflated by the stream of air passing therethrough is spaced above the lower layer 17 and bulged upwardly to define an elongated heating passage 19 extending longitudinally through the structure 10.

The film 16 is formed of a pigmented plastic material (e.g., vinyl or polyethylene) that absorbs solar radiation or, in other words, that is opaque to solar radiation. The material is preferably black so as to optimize the absorption of solar radiation and the conversion thereof into thermal energy. The tubular length of film 16 is held in a desired flattened position by the side strips 13,14 and the blocks 15 positioned thereon. The strips 13,14 are also held in place by stakes 24 with heads in the form of short lengths of angle stock. The heads bear against the top face of the strips 13,14 (FIG. 3) when the stakes 24 are firmly forced into the ground and the "legs" of the angle are adapted to receive one of the blocks 15.

The longitudinal side edges of the tubular length of film 16 are adhered such as by heat sealing to a marginal side edge portion of the sheet 12 of clear plastic film so that the sheet 12 defines when inflated by gas pressure, with the top layer 18 of the tubular length of film 16, a pressurized enclosure 20 that surrounds the tubular length of film 16 and has sufficient pressure to provide structural rigidity. The enclosure 20 also provides an insulating air space between the film 16 and the surrounding atmosphere which may be at a relatively low temperature. Thus, the gaseous mixture, normally air, within the enclosure 20 will normally be at a temperature somewhere between the temperature of the flowing stream in the heating passage 19 and the surrounding atmosphere.

The heating passage 19 has an inlet end 21 and an outlet end 22, the inlet end being connected to a tapered inlet duct 23 through which the gaseous medium, such as, air to be heated is introduced into the passage 19 and the outlet end 22 being connected through a tapered outlet duct 31 to the conduit 32 or other unit through which the heated gaseous stream is conveyed to the point of its ultimate utilization. The inlet and outlet ducts 23 and 32 are also formed of plastic film and are cut using patterns to provide a suitable shape. The inlet duct 23 includes a bottom sheet 25 that rests on the ground, a middle sheet 26 and a top sheet 27. The sheets define a larger duct 28 for introducing air under pressure from the blower 11 to the heating passage 19 and a duct 29 of smaller but increasing cross section for supplying air under pressure to the insulating enclosure 20 so that the enclosure 20 will remain properly inflated as shown. The construction of the outlet end 22 corresponds generally to the construction of the inlet end 21. Preferably the partially heated air in the enclosure 20 is exhausted at a relatively low rate into the stream of heated air leaving the heating passage 19.

Figure 4:
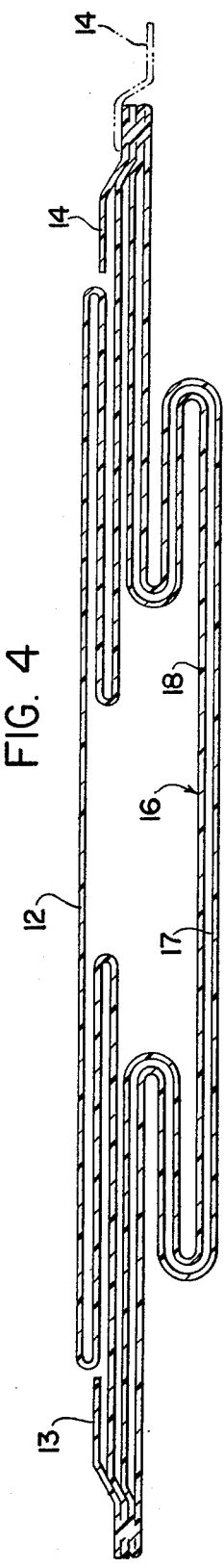
FIG. 4 is a cross sectional view on an enlarged scale illustrating the layers of film of the apparatus of FIGS. 1 and 2 in collapsed condition, such as, during initial shipping and/or subsequent storage.

FIG. 4 illustrates a typical technique for constructing and sealing the tubular length of film 16 and the sheet 12 of clear plastic film to form the desired assembly. As indicated, both the sheet 12 and tubular length of film 16 are folded along longitudinal lines to reduce their respective lateral dimensions and are superposed along their marginal longitudinal edge portions. The strips 13,14 are initially positioned overlying the sheet 12 and are subsequently folded outward when the assembly is installed. The sheet 12 and tubular length of film 16 are heat sealed along the lines indicated to form the completed structure.

In the operation of the assembly A, the structure is initially installed on a flat strip of ground. The blocks 15 are placed on the flaps 13,14 after the stakes 24 are driven through the flaps 13,14 and the necessary connections are made at the inlet end 21 and outlet end 22. When the assembly is ready for operation, the small blower 30 is switched on to force air under pressure through the duct 29 and initially into the insulating enclosure 20. As the supply of air progresses along the length, it causes progressive inflation of the enclosure 20 until it is inflated. When sufficient solar radiation is available, the blower 10 is switched on to inflate the heating passage 19. When this is accomplished, the assembly A will be in the condition illustrated in FIGS. 1, 2 and 3.

Solar radiation that strikes the assembly A will pass through the clear plastic film 12 and impinge upon the surface of the tubular length of film 16. Because the film 16 is of solar radiation absorbing material (i.e., black), it absorbs the solar radiation and converts it to thermal energy which is transferred to the gaseous stream. Accordingly, the gaseous stream will be heated as it progreses through the heating passage 19. Any heat loss to the surrounding atmosphere will be minimized by the insulating enclosure 20. The gases in the insulating enclosure 20 will be heated somewhat as well and may be mixed in with the gaseous stream in the passage 19, if desired.

Typical dimensions of the assembly would be a length of about 100 ft., a width of about 10 ft. and a height of about 4 ft.

If desired, the tubular length of film 16 may be formed of a material that has only a partial opacity so that some solar radiation will pass through the top layer 18 and be absorbed by the bottom layer 17. This results in an additional heating effect due to heat transfer to the flowing air stream from the bottom layer 17 as well as from the top layer 18.

While the invention has been shown and described with respect to specific embodiments thereof this is intended for the purpose of illustration rather than limitation and other variations and modifications of the specific forms herein shown and described will be apparent to those skilled in the art upon a reading of the specification all within the intended spirit and scope of the invention. Accordingly, the patent is not to be limited to the specific embodiments herein shown and described nor in any other way that is inconsistent with the extent to which the progress in the art has been advanced by the invention.

I claim:

1. Apparatus for converting solar radiation into thermal energy for heating a gaseous stream comprising:
   at least one elongated, inflatable heating conduit formed of solar-radiation-absorbing film and adapted to be placed on the ground and inflated by the pressure of a gaseous stream being conveyed therethrough,
   an elongated sheet of solar-radiation-transparent film positioned over said conduit and adapted to form therewith an inflatable closure between said conduit and the surrounding atmosphere,
   means for conveying a gaseous medium through said conduit to be heated therein, under pressure sufficient to inflate said conduit,
   means providing an outlet for heated gaseous medium from said conduit,
   means for introducing a gas under pressure into said enclosure to inflate said enclosure around said conduit, and
   means providing an outlet path from said enclosure to said conduit outlet for introducing heated gas at a low rate from said enclosure into said conduit outlet.

2. Apparatus as defined in claim 1 wherein said heating conduit comprises a tubular length of plastic film.

3. Apparatus as defined in claim 2 wherein said film of said tubular length is substantially opaque.

4. Apparatus as defined in claim 1 wherein said elongated sheet comprises substantially clear plastic film.

5. Apparatus as defined in claim 1 wherein said tubular heating conduit and said elongated sheet are heat sealed together along longitudinal marginal edge portions.

6. Apparatus as defined in claim 1 including longitudinal side flaps attached to said conduit and said sheet and placed on the ground along the length of said apparatus and anchoring means for retaining said flaps in position.

7. Apparatus as defined in claim 6 wherein said anchoring means comprises weights.

8. Apparatus as defined in claim 6 wherein said anchoring means comprises stakes driven through said flaps.

9. A method for converting solar radiation into thermal energy for heating a gaseous stream comprising the steps of:
   providing a tubular length of inflatable solar-radiation-absorbing film placed along a strip of ground exposed to solar radiation,
   insulating said tubular film from the surrounding atmosphere by forming a sealed enclosure thereover with a sheet of solar radiation transparent film and inflating said enclosure by introducing gas thereinto,
   conveying a gaseous stream through said tubular film at a pressure sufficient to inflate it and thereby form a conduit thereof, whereby solar radiation impinging on said solar-radiation-absorbing film is converted to thermal energy that is transferred from said film to said gaseous stream, and
   introducing heated gas at a low rate from said enclosure into said conduit.

* * * * *